US012482382B2

(12) United States Patent
Kang et al.

(10) Patent No.: US 12,482,382 B2
(45) Date of Patent: Nov. 25, 2025

(54) AUGMENTED REALITY DEVICES FOR PATIENTS WITH RETINITIS PIGMENTOSA AND MACULAR DEGENERATION

(71) Applicant: CELLICO Inc., Seongnam-si (KR)

(72) Inventors: Ho Sung Kang, Paju-si (KR); Jong Gi Hong, Incheon (KR)

(73) Assignee: CELLICO Inc., Seongnam-si (KR)

( * ) Notice: Subject to any disclaimer, the term of this patent is extended or adjusted under 35 U.S.C. 154(b) by 62 days.

(21) Appl. No.: 18/539,273

(22) Filed: Dec. 14, 2023

(65) Prior Publication Data

US 2024/0321150 A1    Sep. 26, 2024

(30) Foreign Application Priority Data

Mar. 21, 2023  (KR) .................. 10-2023-0036242

(51) Int. Cl.
*G09G 3/00* (2006.01)
*G06T 3/40* (2024.01)

(52) U.S. Cl.
CPC .............. *G09G 3/001* (2013.01); *G06T 3/40* (2013.01); *G09G 2340/045* (2013.01); *G09G 2354/00* (2013.01); *G09G 2380/08* (2013.01)

(58) Field of Classification Search
CPC ............ G09G 3/001; G09G 2340/045; G09G 2354/00; G09G 2380/08; G06T 3/40; G02C 7/086; G02C 2202/10; G02B 2027/0138; G02B 2027/014; G02B 27/017; G02B 27/0172; A61B 3/024; A61B 3/12; G09B 21/008; G06F 3/011
See application file for complete search history.

(56) References Cited

U.S. PATENT DOCUMENTS

| | | | | |
|---|---|---|---|---|
| 11,160,688 | B2 * | 11/2021 | Cho | G06T 19/006 |
| 11,375,891 | B1 * | 7/2022 | Elsner | A61B 3/12 |
| 2011/0273670 | A1 * | 11/2011 | Tsuta | A61B 3/024 |
| | | | | 351/224 |
| 2015/0190048 | A1 * | 7/2015 | Huang | A61B 3/0033 |
| | | | | 351/239 |
| 2018/0144554 | A1 * | 5/2018 | Watola | G06F 3/012 |
| 2018/0296084 | A1 * | 10/2018 | Kawahara | A61B 3/024 |
| 2019/0298166 | A1 * | 10/2019 | Smith | A61B 3/0091 |
| 2022/0269342 | A1 * | 8/2022 | Kim | G06F 3/017 |
| 2023/0022601 | A1 * | 1/2023 | Grillini | A61B 3/024 |

FOREIGN PATENT DOCUMENTS

| | | |
|---|---|---|
| JP | 2010-068821 A | 4/2010 |
| JP | 2018045067 A | 3/2018 |
| JP | 2018-153477 A | 10/2018 |
| JP | 2020056946 A | 4/2020 |
| KR | 10-1856014 B1 | 5/2018 |

\* cited by examiner

*Primary Examiner* — Fernando Alcon
(74) *Attorney, Agent, or Firm* — ArentFox Schiff LLP; Yun H. Choe (57) ABSTRACT

The present disclosure provides an augmented reality (AR) device for patients with retinitis pigmentosa and macular degeneration comprising a map providing unit, a region setting unit, and a region display unit, wherein the map providing unit sequentially drives a plurality of scanning points included in a display of wearable glasses to provide a scotoma map wherein a user's scotoma is checked according to the user's input signal, the region setting unit sets the user's scotoma region based on the scotoma map; the region display unit displays an external image corresponding to the scotoma region in a display region included in the display.

8 Claims, 14 Drawing Sheets

AUGMENTED REALITY DEVICES FOR PATIENTS WITH RETINITIS PIGMENTOSA AND MACULAR DEGENERATION

CROSS-REFERENCE TO RELATED APPLICATION

This application claims benefit of priority to Korean Patent Application No. 10-2023-0036242 filed Mar. 21, 2023, the contents of which is incorporated herein by reference in its entirety.

FIELD

The present disclosure relates to an augmented reality (AR) device for patients with retinitis pigmentosa and macular degeneration.

BACKGROUND

Retinitis pigmentosa (RP) is a progressive retinal degenerative disease caused by dysfunction of photoreceptors distributed in the retina, and macular degeneration is a disease in which waste is deposited under the macula, causing retinal visual cells to degenerate, or abnormal blood vessels are abnormally generated below macula to deteriorate vision. Recently, various studies have been conducted to solve problems arising as the number of patients with retinitis pigmentosa and macular degeneration increases.

SUMMARY

An aspect of the present disclosure may provide an augmented reality (AR) device capable of setting a scotoma region based on a scotoma map in which a user's scotoma is checked according to the user's input signal by sequentially driving a plurality of scanning points included in a display, and displaying an external image corresponding to the scotoma region in a display region included in the display, thereby compensating for a narrowed field of view of patients with retinitis pigmentosa and macular degeneration and improving the quality of life of patients.

In an aspect, an augmented reality (AR) device for patients with retinitis pigmentosa and macular degeneration includes a map providing unit, a region setting unit, and a region display unit. The map providing unit may sequentially drive a plurality of scanning points included in a display of wearable glasses to provide a scotoma map in which a user's scotoma is checked according to the user's input signal. The region setting unit may set the user's scotoma region based on the scotoma map. The region display unit may display an external image corresponding to the scotoma region in a display region included in the display.

The map providing unit may include a scanning driving unit and a determining unit. The scanning driving unit may sequentially turn on and turn off the plurality of scanning points. The determining unit may determine whether to identify turn-on and turn-off of the scanning points according to the user's input signal.

The scanning points may be arranged on a plurality of reference lines formed based on a center of the display.

The scanning driving unit may drive the scanning points arranged on each of the plurality of reference lines in order of distance away from the center of the display.

The region setting unit may set the scotoma region according to scotoma points corresponding to the scotoma among the scanning points included in the scotoma map.

When the numbers of scotoma points arranged on the plurality of reference lines are different, the region setting unit may set the scotoma region according to the number of scotoma points arranged on a selection reference line in which a largest number of scotoma points is arranged.

The scotoma region may be in the form of a circle having a diameter being a length corresponding to the number of scotoma points arranged on the selection reference line.

The region display unit may include a region divider and a region selecting unit. The region divider may divide the display into a plurality of segment regions. The region selecting unit may select one of the plurality of segment regions as the display region according to the user's input signal.

When movement of an object having a speed equal to or greater than a predetermined reference speed is detected at a position corresponding to the display region, the region selecting unit may select, as the display region, a farthest segment region among the plurality of segment regions in a direction opposite to a movement direction of the object.

The AR device may further include an image correcting unit. The image correcting unit may enlarge the external image captured by a camera included in the wearable glass and display the external image corresponding to the scotoma region outside the scotoma region.

The AR device may reduce the external image captured with the camera included in the wearable glasses and display the reduced external image on the display region.

In addition to the technical problems of the present disclosure mentioned above, other features and advantages of the present disclosure are described below or may be clearly understood by those skilled in the art to which the present disclosure pertains from such description.

According to the present disclosure as described above, the following effects are achieved.

The augmented reality device for patients with retinitis pigmentosa and macular degeneration according to the present disclosure may set a scotoma region based on a scotoma map in which a user's scotoma is checked according to the user's input signal by sequentially driving a plurality of scanning points included in a display, and display an external image corresponding to the scotoma region in a display region included in the display, thereby compensating for a narrowed field of view of patients with retinitis pigmentosa and macular degeneration and improving the quality of life of patients.

DETAILED DESCRIPTION

In the specification, in adding reference numerals to components throughout the drawings, it is to be noted that like reference numerals designate like components even though components are shown in different drawings.

Meanwhile, meanings of the terms described in this specification should be understood as follows.

Terms of singular forms used herein are intended to include their plural forms unless explicitly indicated otherwise, and a scope of the present disclosure is not limited by the terms used herein.

It is to be understood that a term "include" or "have" does not preclude the presence or addition of one or more other features, numerals, operations, components, parts or combinations thereof, which is mentioned in the specification.

Hereinafter, embodiments of the present disclosure are described in detail with reference to the accompanying drawings.

Figure 1:
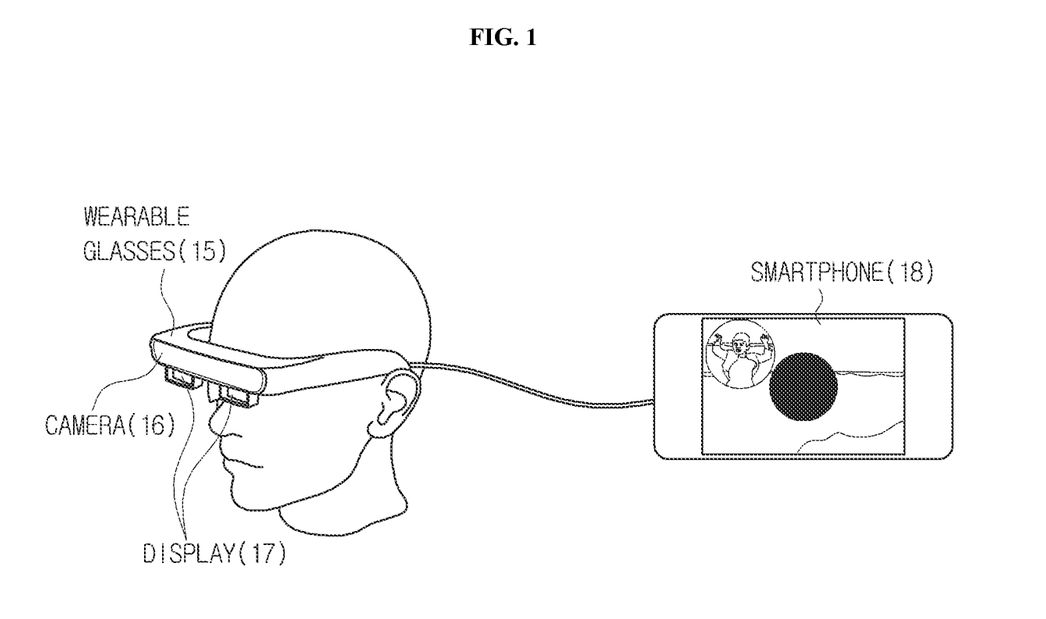
FIGS. 1 and 2 are diagrams illustrating an augmented reality (AR) device for patients with retinitis pigmentosa and macular degeneration according to embodiments of the present disclosure.
Figure 2:
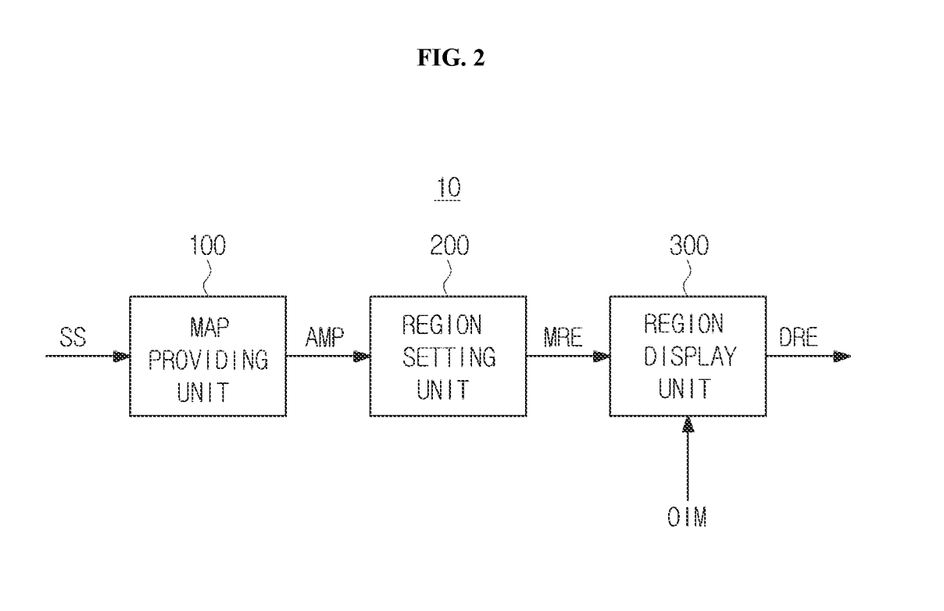
Figure 3:
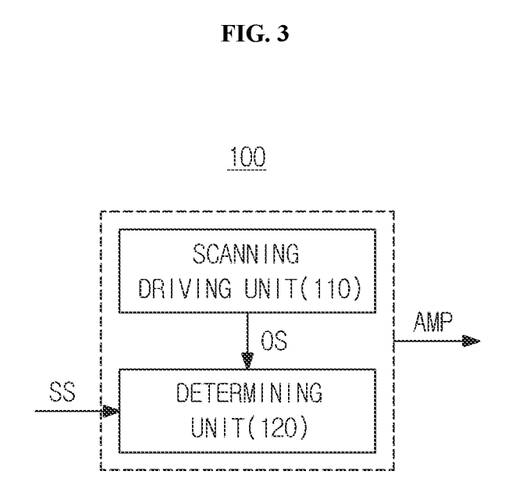
FIG. 3 is a diagram illustrating a map providing unit included in the AR device of FIG. 1.
Figure 4:
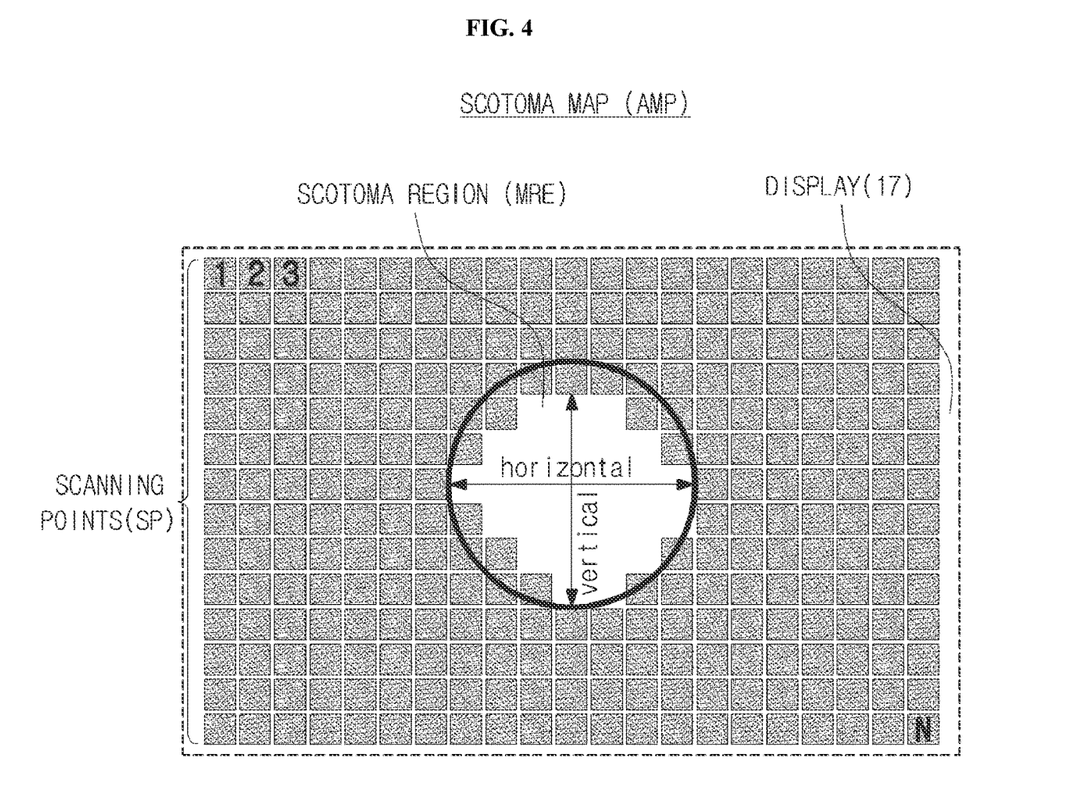
FIGS. 4 and 5 are diagrams illustrating an operation of the AR device of FIG. 1.
Figure 5:
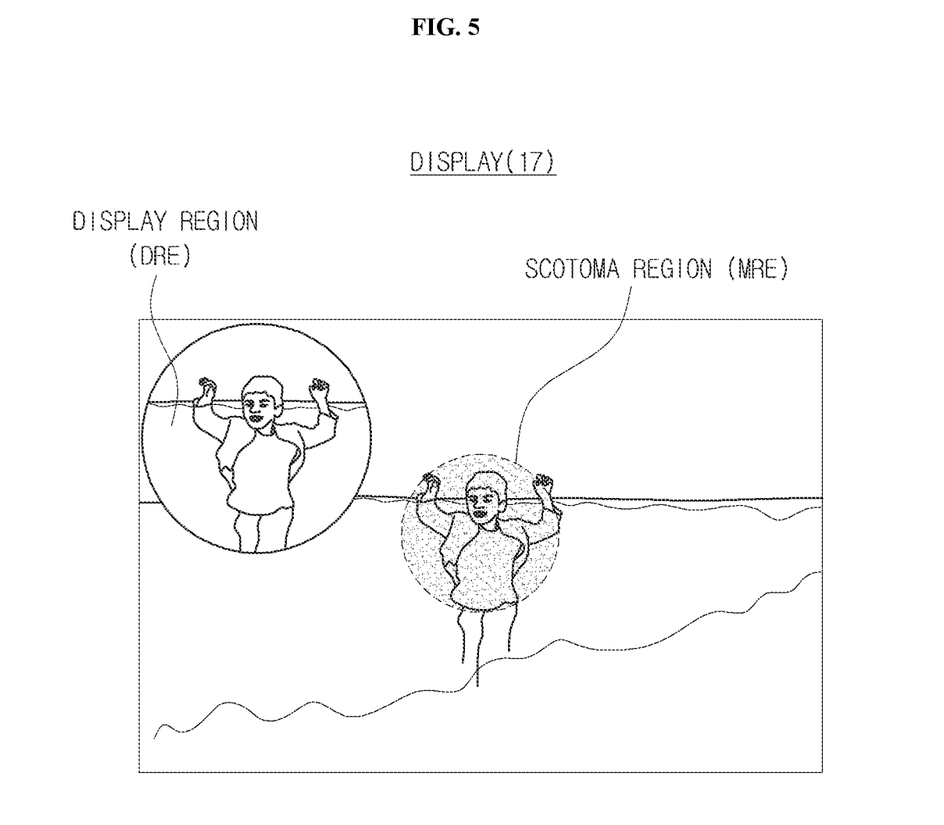
Figure 14:
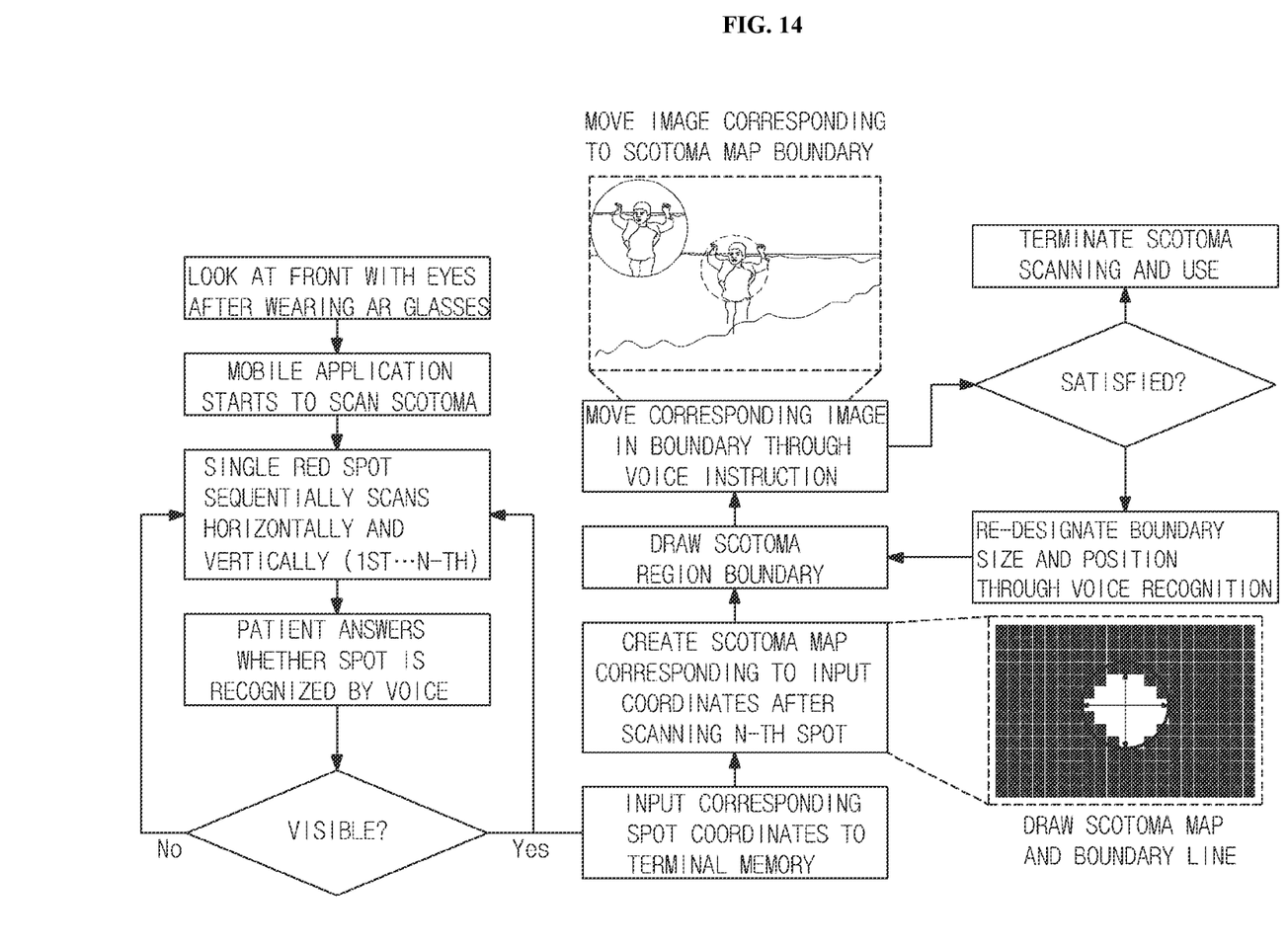
FIG. 14 is a diagram illustrating an AR device for patients with retinitis pigmentosa and macular degeneration according to embodiments of the present disclosure.

FIGS. 1, 2, and 14 are diagrams illustrating an augmented reality (AR) device for patients with retinitis pigmentosa and macular degeneration according to embodiments of the present disclosure, FIG. 3 shows a map providing unit included in the AR device of FIG. 1, and FIGS. 4 and 5 are diagrams illustrating an operation of the AR device of FIG. 1.

Referring to FIGS. 1 to 5 and 14, the AR device 10 for patients with retinitis pigmentosa and macular degeneration according to an embodiment of the present disclosure may include a map providing unit 100, a region setting unit 200, and a region display unit 300. The AR device 10 according to the present disclosure may be included in an overall system including wearable glasses 15 and a smartphone 18. The map providing unit 100 sequentially drives a plurality of scanning points SP included in a display 17 of the wearable glasses 15 to provide a scotoma map AMP that checks a user's scotoma according to the user's input signal SS. The user's input signal SS may be a signal provided in various manners, including the user's voice signal, hand gesture signal, or touch signal. For example, a field of view of a patient (user) with retinitis pigmentosa or macular degeneration may include scotomas that covers a partial region to be invisible. Before using the AR device 10 according to the present disclosure, the map providing unit 100 providing the scotoma map AMP according to the present disclosure may be used to confirm a region in which the user's scotoma is distributed.

In an embodiment, the map providing unit 100 may include a scanning driving unit 110 and a determining unit 120. The scanning driving unit 110 may sequentially turn on and turn off a plurality of scanning points. For example, a plurality of scanning points SP may be arranged on the display 17 included in the wearable glasses 15. The plurality of scanning points SP may include a first scanning point SP1 to an N-th scanning point SPN. The scanning driving unit 110 included in the map providing unit 100 may sequentially turn on and turn off the first scanning point SP1 to the N-th scanning point SPN.

The determining unit 120 may determine whether to identify turn-on and turn-off of the scanning points SP according to the user's input signal SS. For example, when the first scanning point SP1 is turned on, the user may determine whether the first scanning point SP1 included in the display 17 is turned on, and provide the input signal SS to the AR device 10. In this case, the determining unit 120 may display the scanning points included in the scotoma map AMP identified by color according to the input signal SS. For example, when the user provides the input signal SS indicating that "the first scanning point SP1 is turned on," the first scanning point SP1 included in the scotoma map AMP may be displayed in red. In a case in which the user provides the input signal SS indicating that "the first scanning point SP1 is turned off" even though the scanning driving unit 110 turns on the first scanning point SP1, the first scanning point SP1 included in the scotoma map AMP may be displayed in white.

The region setting unit 200 may set the user's scotoma region MRE based on the scotoma map AMP. There may be various methods of setting the scotoma region MRE formed according to the scotoma map AMP. For example, in a region displayed in white on the scotoma map AMP, the scotoma region MRE may be set based on a horizontal interval (width), or the scotoma region MRE may be set based on a vertical interval (length). For example, a circle with the horizonal interval as a diameter thereof may be determined as the scotoma region MRE, or a circle with the vertical interval as a diameter thereof may be determined as the scotoma region MRE. In addition, a region in which an interval longer than the horizontal interval or the vertical interval is a diameter may be determined as the scotoma region MRE.

The region display unit 300 may display an external image OIM corresponding to the scotoma region MRE on a display region DRE included in the display 17. Although the scotoma region MRE measured from the user using the AR device 10 according to the present disclosure is real in the external image OIM of a camera 16, it may be a region that is invisible to the user's eyes. In this case, by placing an actual image corresponding to the scotoma region MRE in a region (a display region) other than the scotoma region MRE of the display 17, user inconvenience caused by blocking the field of view may be eliminated.

The AR device 10 for patients with retinitis pigmentosa and macular degeneration according to the present disclosure may set the scotoma region MRE based on the scotoma map AMP in which the user's scotoma is checked according to the user's input signal by sequentially driving the plurality of scanning points SP included in the display 17 and display the external image OIM corresponding to the scotoma region MRE in the display region DRE included in the display 17, thereby compensating for a narrowed field of view of patients with retinitis pigmentosa and macular degeneration and improving the patients' quality of life. In addition, the AR device 10 according to the present disclosure may also be applied to glaucoma patients, diabetic retinopathy patients, etc.

Figure 6:
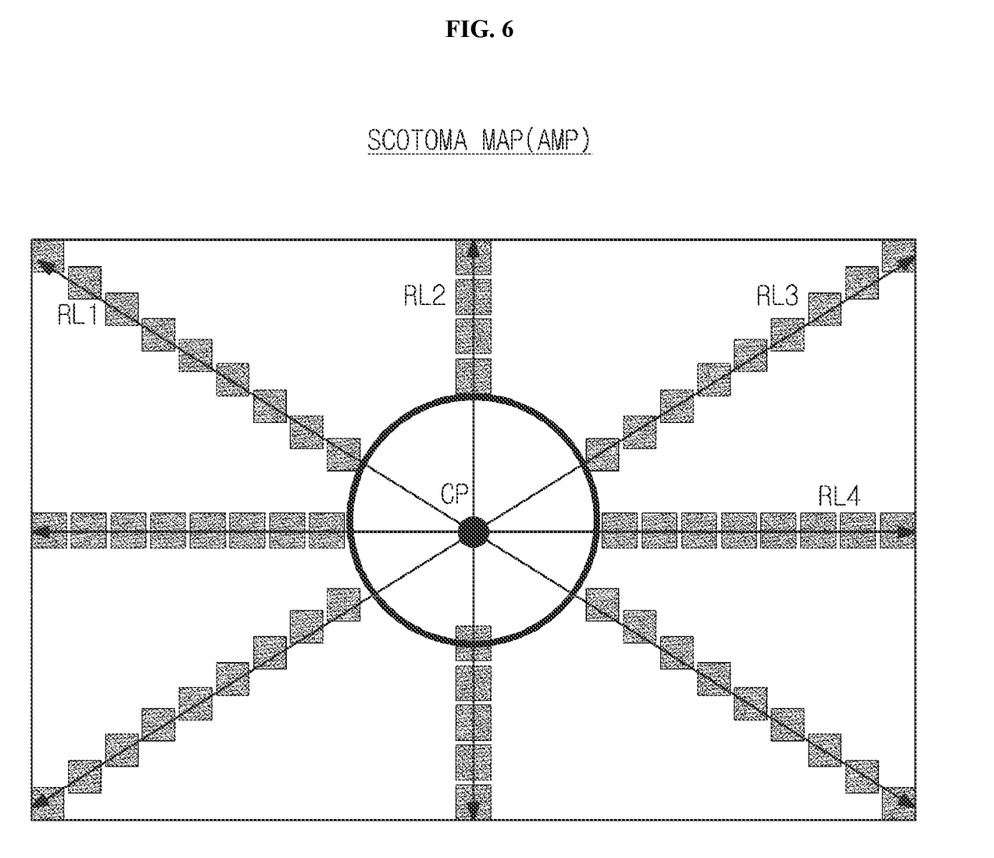
FIGS. 6 and 7 are diagrams illustrating an operation example of the map providing unit and the region setting unit included in the AR device of FIG. 1.
Figure 7:
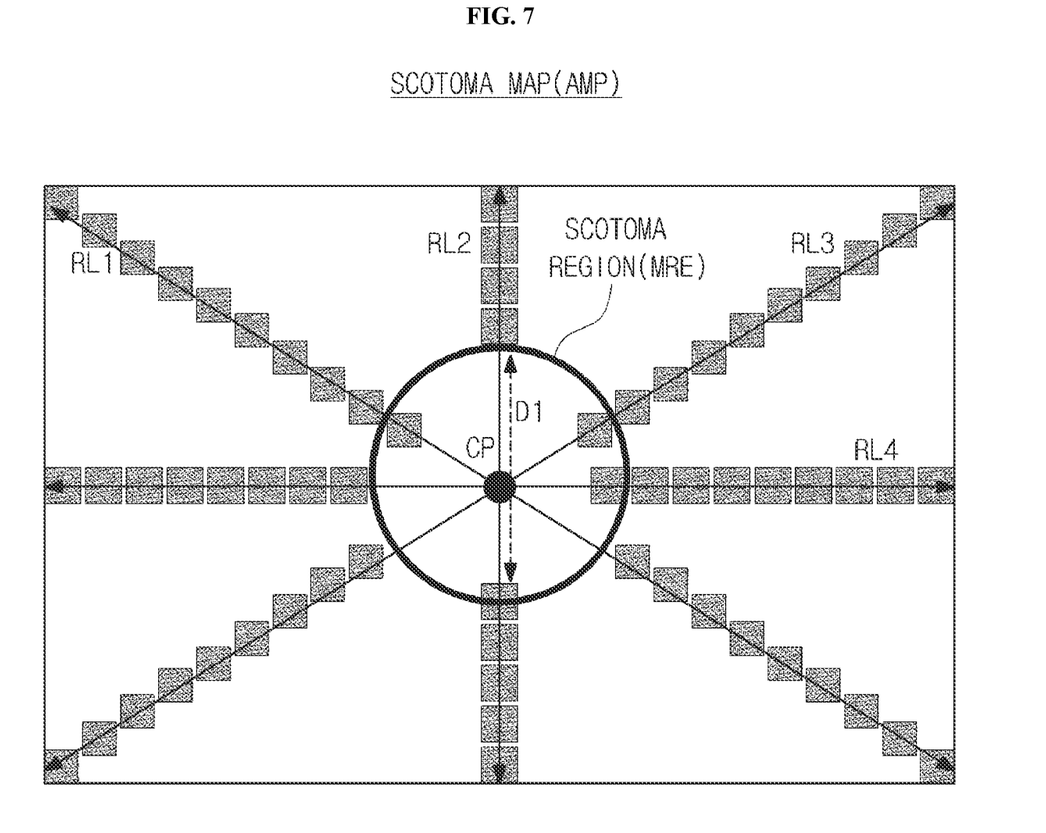

FIGS. 6 and 7 are diagrams illustrating an operation example of the map providing unit and the region setting unit included in the AR device of FIG. 1.

Referring to FIGS. 1 to 7, in an embodiment, the scanning points SP may be arranged on a plurality of reference lines formed based on the center CP of the display 17. For example, as shown in FIG. 4, in the case of checking all scanning points SP included in the display 17, not only the user's (patient's) fatigue may increase, but an examination time may also become longer. To solve this problem, the plurality of reference lines may be used.

In an embodiment, the scanning driving unit 110 may drive the scanning points SP respectively disposed on the plurality of reference lines in the order of their distances from the center CP of the display 17. For example, the plurality of reference lines may include first to fourth reference lines RL1 to RL4. The first reference line RL1 may be a straight line connecting the top left corner to the bottom right corner of the display 17, and the second reference line RL2 may be a straight line connecting the top center to the bottom center of the display 17. In addition, the third reference line RL3 may be a straight line connecting the top right corner to the bottom left corner of the display 17, and the fourth reference line RL4 may be a straight line connecting the center of the right to the center of the left of the display 17. The AR device 10 according to the present disclosure may configure the scotoma map AMP by driving only the scanning points SP arranged on the first reference line RL1 to the fourth reference line RL4.

In an embodiment, the region setting unit 200 may set the scotoma region MRE according to scotoma points corresponding to scotomas among the scanning points SP included in the scotoma map AMP. For example, if the user provides an input signal SS indicating that "the first scanning point placed on the first reference line RL1 is turned on," the first scanning point placed on the first reference line RL1 included in the scotoma map AMP may be displayed in red, and if the user provides an input signal SS indicating that "the first scanning point placed on the first reference line RL1 is turned off" although the scanning driving unit 110 turns on the first scanning point placed on the first reference line RL1, the first scanning point disposed on the first reference line RL1 included in the scotoma map AMP may be displayed in white. Here, the scanning point displayed in white may be a scotoma point.

In an embodiment, when the number of scotoma points arranged on a plurality of reference lines is different, the region setting unit 200 may set the scotoma region MRE according to the number of scotoma points arranged on a selection reference line in which the largest number of scotoma points is arranged. For example, the number of scotoma points placed in the second reference line RL2 may be 5, and the number of scotoma points placed in the first reference line RL1, third reference line RL3, and fourth reference line RL4 may be 4. In this case, the scotoma points arranged on the first to fourth reference lines RL1 to RL4 may be different. Here, the region setting unit 200 may select the second reference line RL2 on which the largest number of scotoma points is arranged as the selection reference line and set the scotoma region MRE based on the five scotoma points arranged on the second reference line RL2.

In addition, in another manner, the region setting unit 200 may select the first reference line RL1 on which the smallest number of scotoma points is arranged as the selection reference line, and set the scotoma region MRE based on the four scotoma points placed on the first reference line RL1. Here, the method by which the region setting unit 200 sets the scotoma region is not limited to the method described above and may be determined in various manners.

In an embodiment, the scotoma region MRE may be in the shape of a circle in which a length corresponding to the number of scotoma points arranged on the selection reference line is a diameter. For example, if the selection reference line is the second reference line RL2 and the number of scotoma points arranged on the second reference line RL2 is 5, the length corresponding to the five scotoma points may be a first length D1. In this case, the scotoma region MRE may be a circular region having the first length D1 based on the center CP of the display 17.

Figure 8:
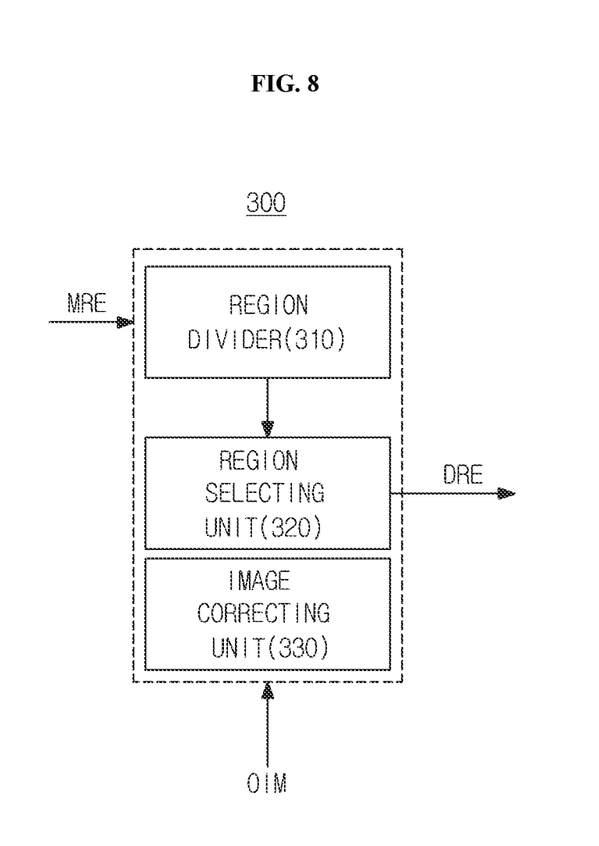
FIGS. 8 and 9 are diagrams illustrating an operation example of a region display unit included in the AR device of FIG. 1.
Figure 9:
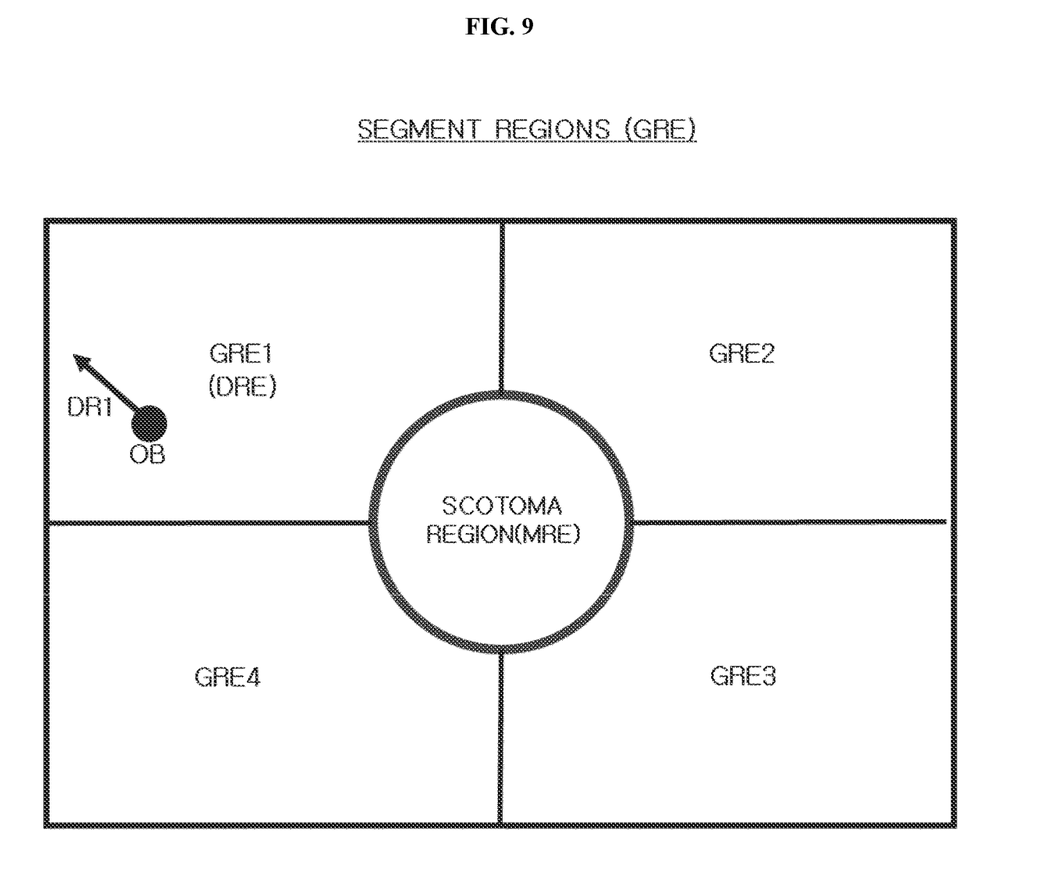

FIGS. 8 and 9 are diagrams illustrating an operation example of the region display unit included in the AR device of FIG. 1.

Referring to FIGS. 1 to 9, in an embodiment, the region display unit 300 may further include a region divider 310 and a region selecting unit 320. The region divider 310 may divide the display 17 into a plurality of segment regions GRE. For example, the plurality of segment regions GRE may include a first segment region GRE1 to a fourth segment region GRE4. As shown in FIG. 9, the first segment region GRE1 may be a region excluding the scotoma region MRE in the top left of the display 17, and the second segment region GRE2 may be a region excluding the scotoma region MRE in the top right of the display 17. In addition, the third segment region GRE3 may be a region excluding the scotoma region MRE in the bottom right of the display 17, and the fourth segment region GRE4 may be a region excluding the scotoma region MRE in the bottom left of the display 17.

The region selecting unit 320 may select one of the plurality of segment regions GRE as the display region DRE according to the user's input signal SS. For example, the region selecting unit 320 may select one of the first to fourth segment regions GRE1 to GRE4 as the display region DRE according to the user's input signal SS and display an external image OIM corresponding to the scotoma region MRE.

In an embodiment, when movement of an object OB at a predetermined reference speed or higher is detected at a position corresponding to the display region DRE, the region selecting unit 320 may select the farthest segment region among the plurality of segment regions GRE in a direction opposite to a movement direction of the object OB as the display region DRE. For example, the first segment region GRE1 may be the display region DRE, and the user cannot check the actual external image OIM corresponding to the first segment region GRE1 due to the display region DRE. In this case, the AR device 10 according to the present disclosure may detect the movement of the object OB in real space corresponding to the first segment region GRE1, and if a speed of the object OB is equal to or greater than a reference speed and the movement direction of the object OB is a first direction DR1, the region selecting unit 320 may move the display region DRE to the fourth segment region GRE4 located farthest in the opposite direction of the first direction DR1 in the display.

Figure 10:
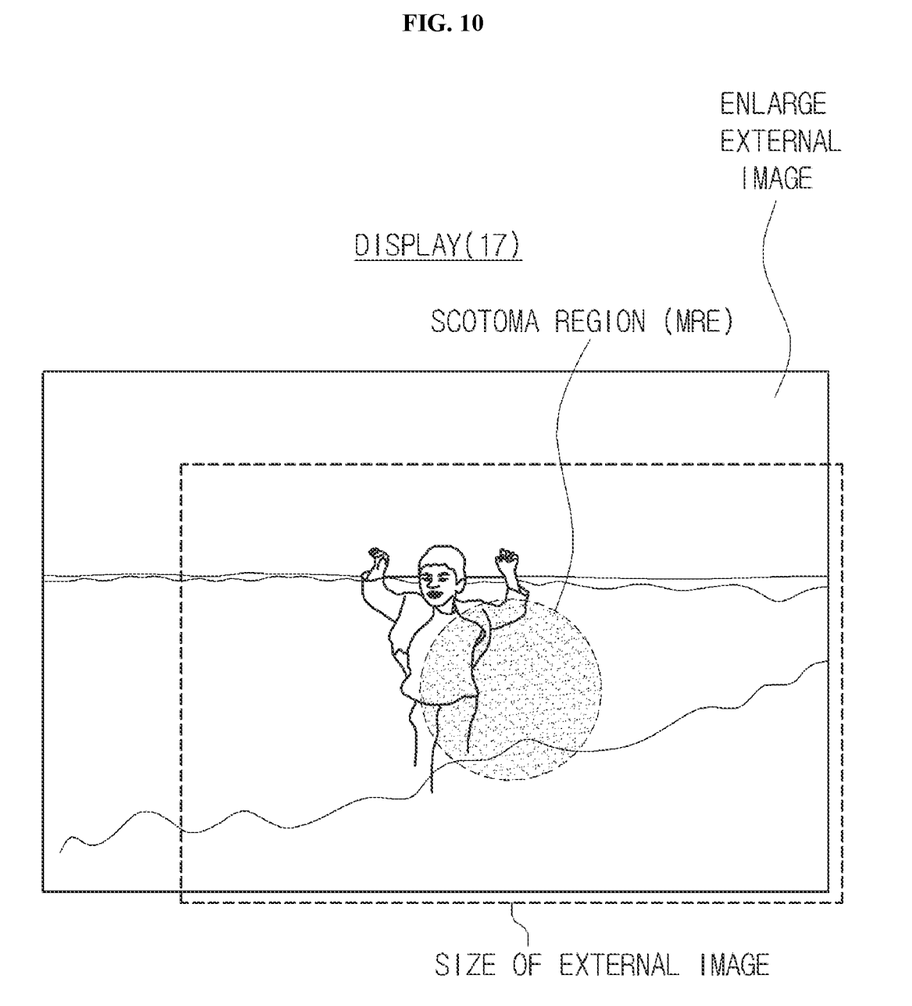
FIG. 10 is a diagram illustrating an embodiment of the AR device of FIG. 1.

FIG. 10 is a diagram illustrating an embodiment of the AR device of FIG. 1, and FIGS. 11 to 13 are diagrams illustrating another embodiment of the AR device of FIG. 1.

Referring to FIGS. 1 to 13, in an embodiment, the AR device 10 may further include an image correcting unit 330. The image correcting unit 330 may enlarge the external image OIM captured by the camera 16 included in the wearable glass 15 and display the external image OIM corresponding to the scotoma region MRE outside the scotoma region MRE. For example, when the object OB or a person is placed in the user's scotoma region MRE and the field of view is blocked, the image correcting unit 330 included in the AR device 10 according to the present disclosure may enlarge the image captured by the camera 16 on the top left to display the object OB or person previously placed in the scotoma region MRE outside the scotoma region MRE.

Figure 11:
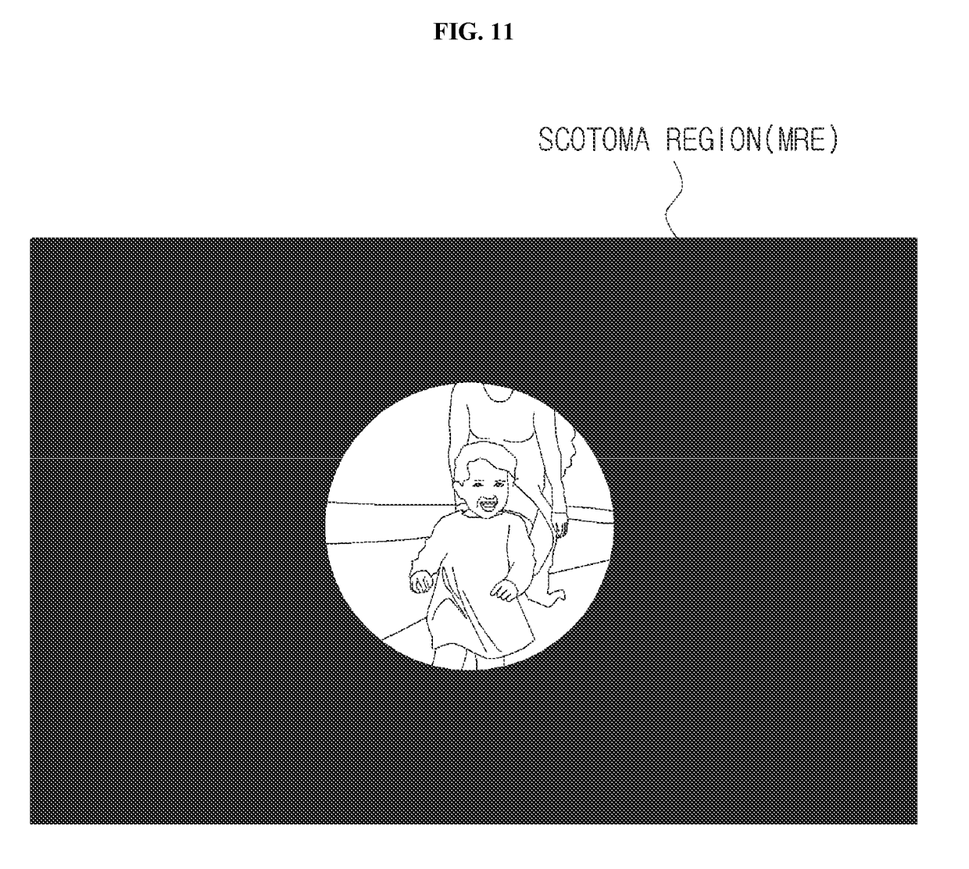
FIGS. 11 to 13 are diagrams illustrating another embodiment of the AR device of FIG. 1.
Figure 12:
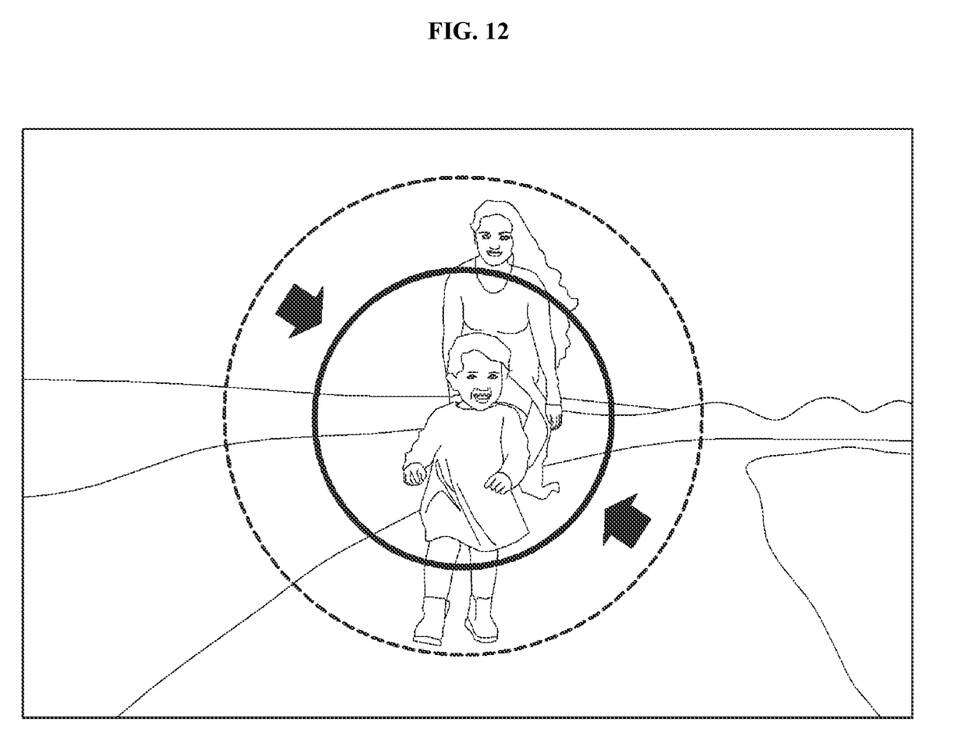
Figure 13:
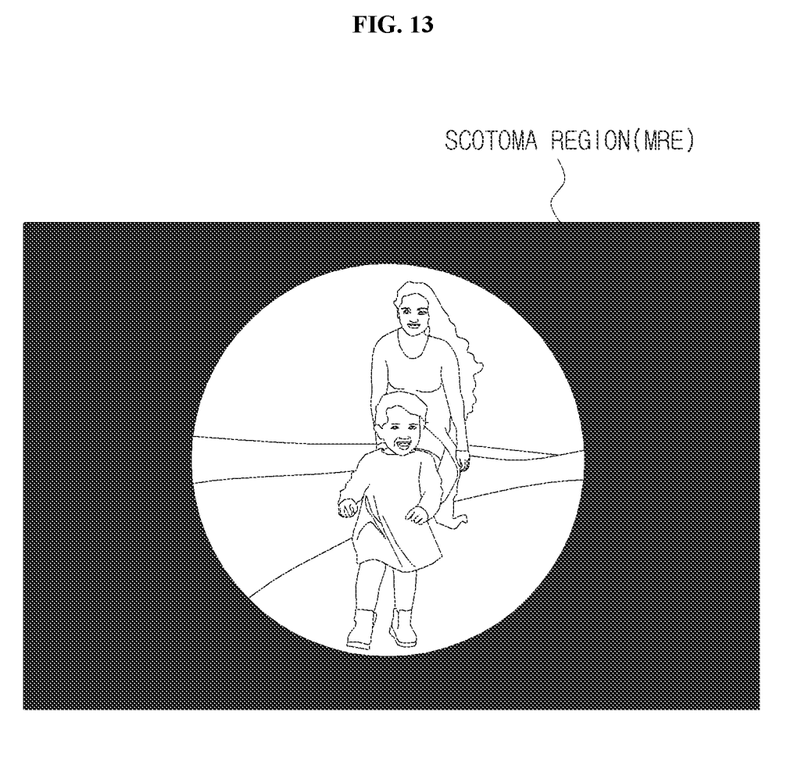

In addition, in an embodiment, the AR device 10 may reduce the external image OIM captured by the camera 16 included in the wearable glasses 15 and display the same in the display region DRE. For example, depending on the patient, the remaining portion of the patient's field of view, excluding the central region, may be the scotoma region MRE. In this case, the external image OIM captured by the camera 16 may be reduced using the image correcting unit 330 and controlled so that a wider range is placed in the central region. In addition, the AR device 10 according to the present disclosure may correct external images in various manners, including moving, enlarging, and reducing external images, emphasizing outlines, or displaying the images in black and white.

The AR device 10 for patients with retinitis pigmentosa and macular degeneration according to the present disclosure may set the scotoma region MRE based on the scotoma map AMP in which the user's scotoma is checked according to the user's input signal SS by sequentially driving the plurality of scanning points SP included in the display 17 and display the external image OIM corresponding to the scotoma region MRE in the display region DRE included in the display 17, thereby compensating for a narrowed field of view of patients with retinitis pigmentosa and macular degeneration and improving the patients' quality of life.

In addition to the above-mentioned technical tasks of the present disclosure, other features and advantages of the present disclosure may be described below, or may be clearly understood by those skilled in the art to which the present disclosure pertains from such description and explanation.

What is claimed is:

1. An augmented reality (AR) device for patients with retinitis pigmentosa and macular degeneration, the AR device comprising:
    a processor configured to provide a map sequentially driving a plurality of scanning points included in a display of wearable glasses to provide a scotoma map in which a user's scotoma is checked according to the user's input signal;
    a processor figured to set a region setting the user's scotoma region based on the scotoma map; and
    a processor configured to display a region displaying an external image corresponding to the scotoma region in a display region included in the display,
    wherein the processor configured to provide a map comprising:
        a processor configured to scan to turn on and off sequentially the plurality of scanning points; and
        a processor configured to determine whether to turn on and to turn off the scanning points according to the user's input signal,
    wherein
        the processor configured to scan drives the scanning points arranged on each of the plurality of reference lines in order of distance away from the center of the display; and
        the scanning points are arranged on a plurality of reference lines formed based on a center of the display.

2. The AR device of claim 1, wherein the processor configured to set a region sets the scotoma region according to scotoma points corresponding to the scotoma among the scanning points included in the scotoma map.

3. The AR device of claim 2, wherein, when the numbers of scotoma points arranged on the plurality of reference lines are different, the processor configured to set a region sets the scotoma region according to the number of scotoma points arranged on a selection reference line in which a largest number of scotoma points is disposed.

4. The AR device of claim 3, wherein the scotoma region is in the form of a circle having a diameter being a length corresponding to the number of scotoma points arranged on the selection reference line.

5. The AR device of claim 4, wherein the processor configured to display a region comprising:
    a region divider dividing the display into a plurality of segment regions; and
    a process configured to select a region selecting one of the plurality of segment regions as the display region according to the user's input signal.

6. The AR device of claim 5, wherein, when movement of an object having a speed equal to or greater than a predetermined reference speed is detected at a position corresponding to the display region, the processor configured to select a region selects, as the display region, a farthest segment region among the plurality of segment regions in a direction opposite to a movement direction of the object.

7. The AR device of claim 6, further comprising a processor configured to correct an image enlarging the external image captured by a camera included in the wearable glass and displaying the external image corresponding to the scotoma region outside the scotoma region.

8. The AR device of claim 7, wherein the AR device reduces the external image captured with the camera included in the wearable glasses and displays the reduced external image on the display region.

* * * * *